Aug. 15, 1961 — W. R. POLANIN — 2,996,153
CLASP BRAKE
Filed Dec. 11, 1957 — 2 Sheets-Sheet 2
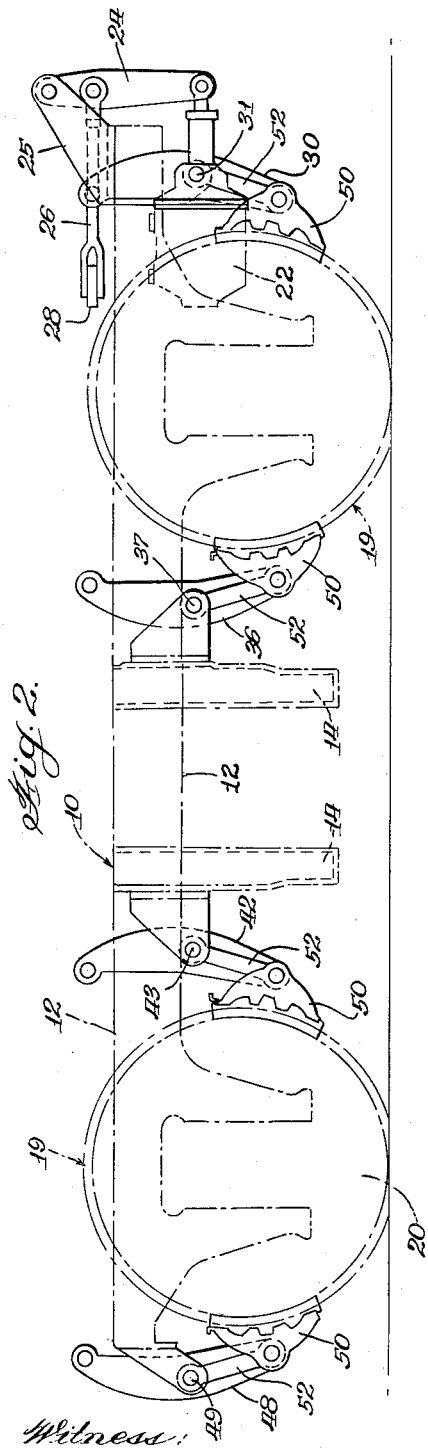
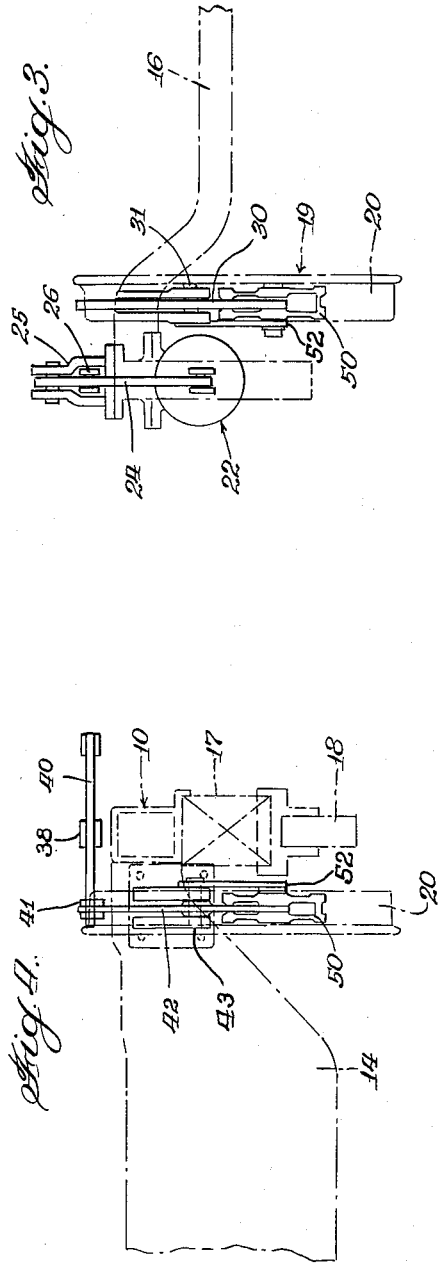
INVENTOR.
Walter R. Polanin
BY Walter J. Schlegel, Jr.
Atty.
Witness:
William N. Ember

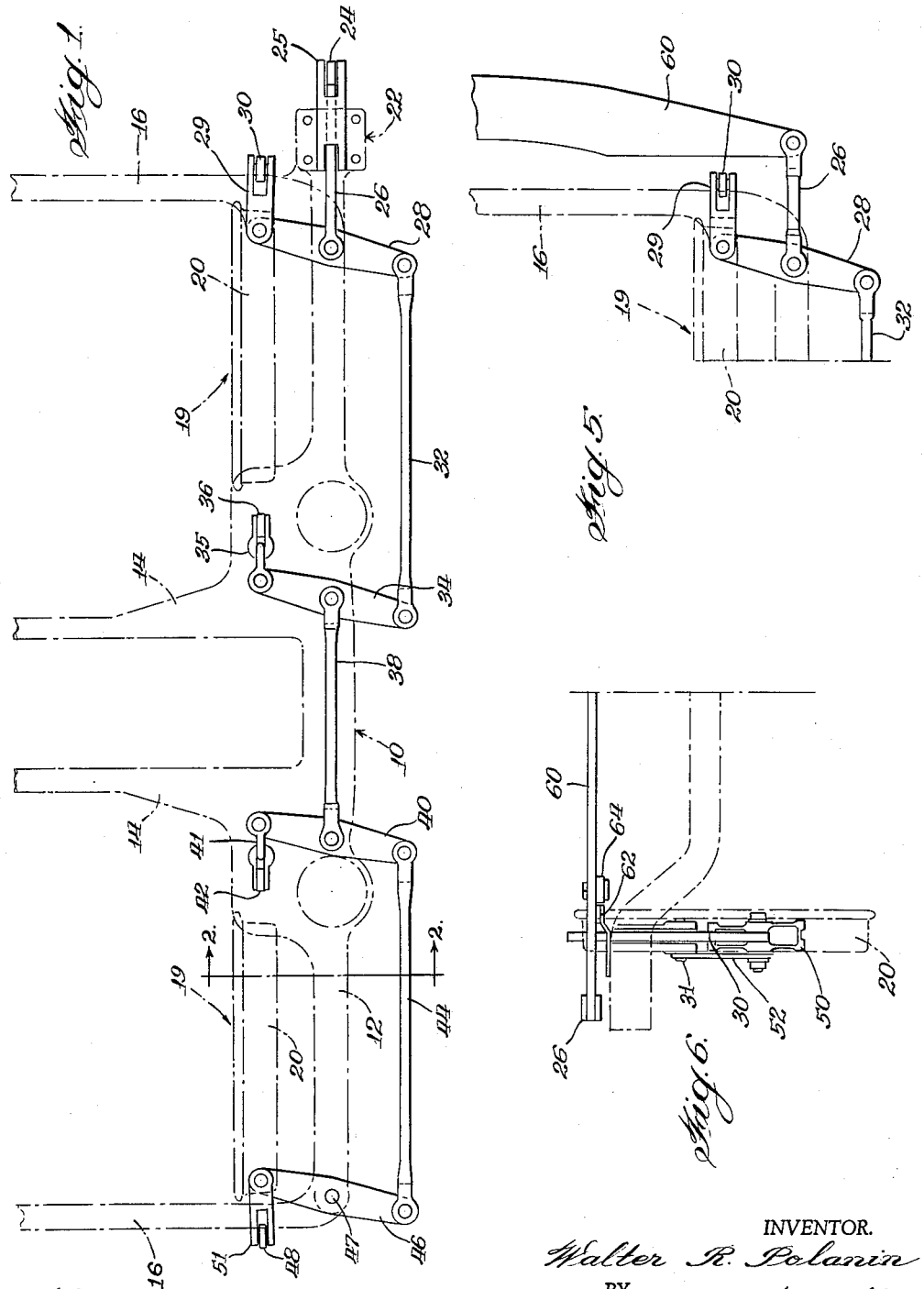

United States Patent Office 2,996,153
Patented Aug. 15, 1961

2,996,153
CLASP BRAKE
Walter R. Polanin, Hammond, Ind., assignor to American Steel Foundries, Chicago, Ill., a corporation of New Jersey
Filed Dec. 11, 1957, Ser. No. 702,162
1 Claim. (Cl. 188—56)

This invention relates to railway brake rigging and more particularly to rigging commonly known as clasp brakes wherein brake heads and brake shoes are applied to opposite sides of each car wheel.

An object of my invention is to provide an improved and more efficient linkage arrangement of the conventional power clasp brake system for use in the modern railway car trucks.

Another object is to provide a brake linkage that is simple to design, is easily assembled for installation and repair, and does not interfere with the operational functions of the wheel and axle assembly.

Still another object of the invention is to provide a clasp brake with a novel arrangement of live and dead levers to transmit power from the cylinder.

These and other objects of the invention will become apparent from an examination of the following description and drawings, wherein;

FIGURE 1 is a fragmentary top plan view of a railway car truck embodying the invention, only one-half being shown inasmuch as the brake arrangement is similar on the opposite side of the truck;

FIGURE 2 is a side elevational view of the structure shown in FIGURE 1;

FIGURE 3 is an end view taken from the right as seen in FIGURES 1 and 2;

FIGURE 4 is a fragmentary end elevational view taken along the line 2—2 of FIGURE 1;

FIGURE 5 is a fragmentary top plan view of a modification of the truck of FIGURE 1, only a portion of the view being shown inasmuch as the brake arrangement of the undisclosed portion of FIGURE 5 is similar to that of FIGURE 1, and FIGURE 6 is a fragmentary end view taken from the right, as seen in FIGURE 5.

To achieve clarity, certain structural details have been omitted from various views where said details are believed to be adequately shown in other views.

Like parts disclosed in both embodiments have been designated with like numerals.

As will be seen from the drawings, a truck frame, generally designated 10, comprises side rails 12, transoms 14, and end rails 16. The truck frame 10 may be supported on any convenient form of resilient means 17, said resilient means 17 being supported by equalizers 18 the ends of which are carried on journal boxes (not shown) at opposite ends of the truck, said journal boxes forming the usual means of connection between the truck frame 10 and the journal portions of the associated wheel and axle assemblies 19. Each of the assemblies 19 comprises a pair of wheels 20 interconnected by an axle (not shown).

Referring now to FIGURES 1, 2, 3, and 4, there is shown mounted to the frame 10 longitudinally of the truck, and at one corner thereof, a power cylinder 22 which may be operatively connected to the lower end of a dead vertical cylinder lever 24, said lever being fulcrumed at its upper end to a bifurcated guide bracket 25 extending outwardly and upwardly away from the frame 10. The lever 24 has a pivotal connection intermediate its ends to an end of a horizontaly disposed rod 26 located centrally of the bracket 25 and extending longitudinally of the truck. The rod 26 may be connected at its opposite end to a horizontally disposed live actuating lever 28 intermediate the ends thereof, said actuating lever 28 being connected at the inboard end thereof to a movable compression link 29 connected to the upper end of a dead vertical brake lever 30. Brake lever 30 may be pivotally connected intermediate its ends, as at 31, to the frame 10. The actuating lever 28 may be pivotally connected at its outboard end to a horizontal pull rod 32 disposed longitudinally of the truck, said pull rod 32 having its opposite end pivotally connected to the outboard end of a horizontal live actuating lever 34. The actuating lever 34 may be pivotally connected at its inboard end, by a tension link and clevis 35, to the upper end of a dead vertical brake lever 36 which may be pivotally connected intermediate its ends, as at 37, to frame 10.

A horizontal pull rod 38 may be pivotally connected at one end thereof to live actuating lever 34 intermediate the ends of the latter, said pull rod 38 having its opposite end pivotally connected to a horizontal live actuating lever 40 intermediate the ends thereof. The live actuating lever 40 may be pivotally connected at its inboard end by a tension link and clevis 41 to the upper end of a dead vertical brake lever 42 which may be pivotally connected intermediate its ends, as at 43, to the frame 10. The live actuating lever 40 may be pivotally connected at its outboard end to an end of a horizontal pull rod 44. The pull rod 44 may be disposed longitudinally of the truck and may have its opposite end pivotally connected to the outboard end of a horizontal dead actuating lever 46. Dead actuating lever 46 may be pivotally connected intermediate its ends, as at 47, to the frame 10 and may have its inboard end pivotally connected by a compression link 51 to the upper end of a vertical dead brake lever 48. The brake lever 48 may be pivotally connected intermediate its ends as at 49, to the frame 10.

Each brake lever carries at the lower end thereof a brake head assembly 50 engageable with the wheel tread surface of the wheel 20, said assembly also being supported from the frame 10 by a hanger 52.

It will be noted that power means 22 operates in conjunction with similar power means at the opposite side of the truck in order to actuate the brake mechanism which may be disposed at the opposite side of the car.

In operation, as power cylinder 22 is energized, it actuates the lower end of the dead cylinder lever 24 and rotates the cylinder lever in a counterclockwise direction about its pivotal connection with bracket 25, as seen in FIGURE 2. This action carries pull rod 26 to the right which, consequently, carries live actuating lever 28 to the right, as best seen in FIGURE 1. As live actuating lever 28 is carried to the right, pull rod 32 moves to the right and dead brake lever 30 rotates in a clockwise direction about its pivotal connection with the frame to engage its brake head assembly to the related wheel. The pull rod 32, as it is connected to live actuating lever 34, causes the latter to rotate in a counterclockwise direction about its pivotal connection with pull rod 38 in order to pivotally rotate brake lever 36 about its pivotal connection with the frame 10, so that the brake head assembly carried by brake lever 36 engages its related wheel. After brake lever 36 ceases movement, live actuating lever 34 movably carries pull rod 38 to the right which results in live actuating lever 40 moving to the right. As live actuating lever 40 is carried to the right, pull rod 44 moves to the right and dead brake lever 42 rotates in a clockwise direction about its pivotal connection with the frame 10 and thus engages its related brake head assembly to the adjacent wheel. The pull rod 44, as it is connected to dead actuating lever 46, causes the latter to rotate in a counterclockwise direction about its pivotal connection to the frame 10, to thus cause dead brake lever 48 to rotate in a counter-clockwise direction about its pivotal direction to the frame 10 in order to engage its brake head assembly to the related wheel.

It is to be understood that all the action and reaction in the several operational steps of the braking action occur almost simultaneously, thereby providing a smooth evenly functioning brake mechanism. Release of the power means causes the various parts to operate in directions reverse to those just described until the parts assume their normal inoperative positions.

The structure disclosed in the embodiment of FIGURES 5 and 6 is identical to the structure of FIGURES 1–4 except for the fact that the pull rod 26 connects to an equalizer or radius bar 60 interconnecting the brake arrangements on both sides of the truck frame 10. The bar 60 connects the pull rod 26 to a body brake cylinder (not shown).

The equalizer bar 60 may be disposed in the same horizontal plane as rod 26 by means of supports 62 (only one of which is shown) secured to frame 10. Guides 64 limit longitudinal movement of the equalizer bar 60.

It is to be understood that I do not wish to be limited by the exact embodiments of the device shown, which are merely by way of illustration and not limitation, as various and other forms of the device will, of course, be apparent to those skilled in the art without departing from the spirit of the invention or the scope of the claim.

I claim:

A clasp brake arrangement for a four-wheel railway car truck having a frame and a pair of spaced wheel and axle assemblies, comprising in combination: friction means disposed for engagement with inner and outer sides of respective assemblies; a pair of generally vertical inner dead brake levers fulcrumed intermediate their ends to the frame and pivoted adjacent their lower ends to respective inner friction means, a pair of generally vertical outer dead brake levers fulcrumed intermediate their ends to the frame and pivoted adjacent their lower ends to respective outer friction means; a pair of tension links pivoted to the upper ends of respective inner brake levers and extending toward each other; a pair of compression links pivoted to the upper ends of respective outer brake levers and extending toward each other; one pair of inner generally horizontal live actuating levers having their inboard ends pivoted to the respective tension links; a pull rod pivotally interconnecting medial portions of said inner actuating levers; a pair of outer generally horizontal actuating levers having their inboard ends pivoted to the respective compression links; one of said outer pair of actuating levers being a live lever and the other being a dead lever fulcrumed intermediate its ends to the frame; a pair of pull rods pivotally interconnecting the outboard ends of the actuating levers associated with respective wheel and axle assemblies; a power cylinder device mounted on the frame adjacent one end thereof and having a power rod and movable toward that end to actuate the brake; a dead vertical cylinder lever fulcrumed at its upper end to the frame and pivotally connected at its lower end to said power rod; and a tension rod pivotally interconnecting medial portions of the cylinder lever and the live outer actuating lever.

References Cited in the file of this patent

UNITED STATES PATENTS

| | | |
|---|---|---|
| 2,086,840 | Aurien | July 13, 1937 |
| 2,216,093 | Orr | Sept. 24, 1940 |
| 2,237,509 | Tack | Apr. 8, 1941 |
| 2,283,864 | Aurien | May 19, 1942 |
| 2,865,472 | Simanek | Dec. 23, 1958 |